No. 876,852. PATENTED JAN. 14, 1908.
W. S. WATSON.
CUTTING AND FACING TOOL.
APPLICATION FILED JAN. 17, 1907.
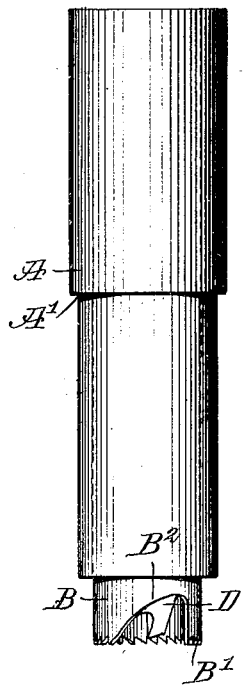
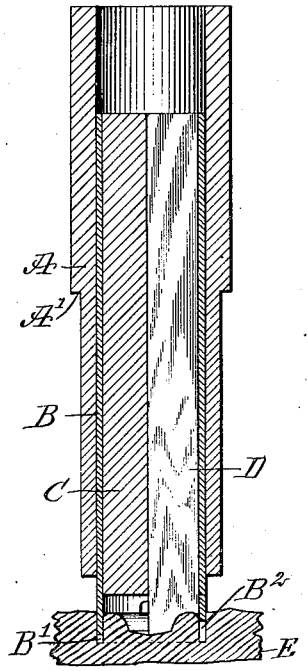
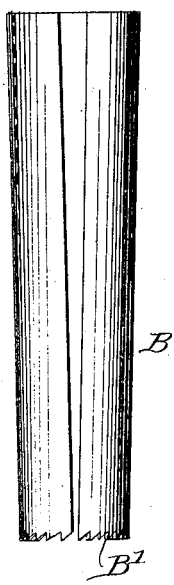
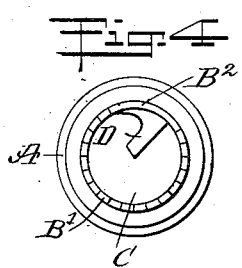
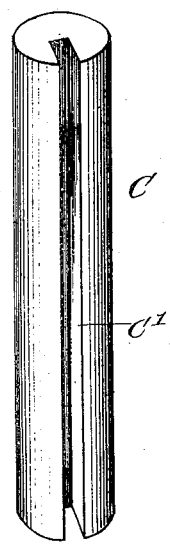
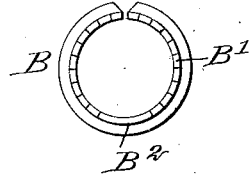
WITNESSES
INVENTOR
Winfield Scott Watson
BY
ATTORNEYS

UNITED STATES PATENT OFFICE.

WINFIELD SCOTT WATSON, OF MEMPHIS, TENNESSEE.

CUTTING AND FACING TOOL.

No. 876,852.   Specification of Letters Patent.   Patented Jan. 14, 1908.

Application filed January 17, 1907. Serial No. 352,738.

*To all whom it may concern:*

Be it known that I, WINFIELD SCOTT WATSON, a citizen of the United States, and a resident of Memphis, in the county of Shelby and State of Tennessee, have invented a new and Improved Cutting and Facing Tool, of which the following is a full, clear, and exact description.

The invention relates to the art of button making such as disclosed, for instance, in the Letters Patent of the United States, Serial No. 831,393, granted to me on September 18, 1906, and in the application for Letters Patent of the United States for an automatic button cutting and shaping machine, Serial No. 324,643, filed by me on July 3, 1906.

The object of the invention is to provide a new and improved cutting and facing tool more especially designed for accurately cutting out the button from a shell and simultaneously facing the button.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improved tool; Fig. 2 is a sectional side elevation of the same; Fig. 3 is a side elevation of the tubular saw; Fig. 4 is an underside view of the tool; Fig. 5 is a perspective view of the filling for the tubular saw and the carrier for the facing tool; and Fig. 6 is an underside view of the tubular saw.

The tubular tool holder A is adapted to be engaged by a self-centering chuck of any approved construction, and held on the spindle of the automatic button-cutting and shaping machine above referred to. Within the tubular tool holder is held the tubular saw B split in the direction of its length and provided at one end with saw teeth B' and a cut-out portion B², the tubular saw when not in position in the holder A being larger in diameter on the upper end than on the end carrying the teeth B', so that in order to insert the tubular saw B into the holder it is necessary for the operator to press the saw on opposite sides of the split, reducing the diameter sufficiently to allow the insertion of the saw into the tool holder, the saw on being released immediately expanding by its own resiliency so as to forcibly contact with the inner surface of the holder, thus holding the saw tightly in place in the holder by its own resiliency and without further mechanical fastening devices. The saw may also be driven into the holder A after the small end is inserted in the holder.

Within the tubular saw B is held tightly a filler and carrier C for stiffening the tubular saw and for carrying the facing tool D. The filler and carrier is preferably made of wood which when driven into the tubular saw and moistened and expands, is held securely in the saw B by friction, and without further mechanical fastening devices. The filler and carrier C is provided with a groove C' which preferably extends from the lower end to the upper end, and into this groove fits the facing tool D having its lower or cutting portion projecting beyond the lower end of the filler and carrier C, the lower or cutting edge of the facing tool D being within the lower end of the tubular saw B and opposite the cut-out portion B², to allow the introduction of the corner of a grinding wheel for grinding the cutting edge B' whenever deemed necessary. When the tool is rotated and fed into a shell or other material E then the saw B makes a circular cut and the facing tool D cuts the face of the material, defined by the cut, to give the face of the button the desired ornamental shape. By having the cut-out portion B² in the tubular saw, the tubular cuttings can readily work out, thus having the tool at all times in good condition to do good work without danger of clogging.

From the foregoing it will be seen that the tubular saw B and the facing tool D are held in the holder A, and the filler and carrier C, without the use of extra mechanical fastening devices, and in addition the filler and carrier C fills the tubular saw B to stiffen the same. When it is desired to adjust the tubular saw B in the holder, or the facing tool D, it is only necessary to slightly tap the upper edge of the tubular saw B or the upper end of the filler and carrier C with a suitable tool, until the lower cutting edges of the saw B and the facing tool D assume the desired relation one to the other. The teeth B' of the tubular saw B can be readily sharpened by filing the same, and the facing tool can be readily ground by the use of a revolving grinding wheel without removing either the saw B or the facing tool D from their supporting members. The holder A is preferably provided with a shoulder A' to permit of conveniently holding the holder A in a vise or the like when adjusting the saw or facing tool D.

Having thus described my invention, I claim as new and desire to secure by Letters Patent:

1. A tool for cutting buttons and the like, comprising a tubular tool holder, a tubular split saw held in the tool holder by its resiliency, a filler and carrier held in the said tubular saw, and a facing tool held on the said filler and carrier.

2. A tool for cutting buttons and the like, comprising a holder, a tubular split saw in the holder, a wooden filler and carrier fitting snugly in the saw and held therein by friction, and a facing tool carried by the said filler and carrier.

3. A tool for cutting buttons and the like, comprising a tubular saw having a cut-out portion at one end, and a facing tool within the said tubular saw and having its cutting edge opposite the cut-out portion of the saw, whereby it is adapted to be reached by a grinding device by way of the said cut-out portion in the tubular saw.

4. A tool for cutting buttons and the like, comprising a holder, a tubular split saw in the holder, a filler and carrier fitting snugly in the saw and held therein by friction, said filler and carrier extending from the upper end of the saw to a point near the lower end thereof and provided with a longitudinal groove extending the length thereof, and a facing tool in the groove of the filler and carrier and projecting beyond the lower end of the same.

In testimony whereof I have signed my name to this specification in the presence of two subscribing witnesses.

WINFIELD SCOTT WATSON.

Witnesses:
    J. W. REINHOLD,
    A. C. YOST.